April 27, 1965

V. POLLASCHEK

METHOD OF MANUFACTURING DRUMS FOR VIDEO RECORDING APPARATUS

Filed Oct. 5, 1962

3,180,019

INVENTOR

VIKTOR POLLASCHEK

BY

Frank R. Jifari

AGENT

United States Patent Office 3,180,019

Patented Apr. 27, 1965

3,180,019
METHOD OF MANUFACTURING DRUMS FOR VIDEO RECORDING APPARATUS

Viktor Pollaschek, Vienna, Austria, assignor to North American Philips Company Inc., New York, N.Y., a corporation of Delaware Filed Oct. 5, 1962, Ser. No. 228,693
Claims priority, application Austria, Oct. 26, 1961, A 8,083/61
9 Claims. (Cl. 29—414)

Figure 1:
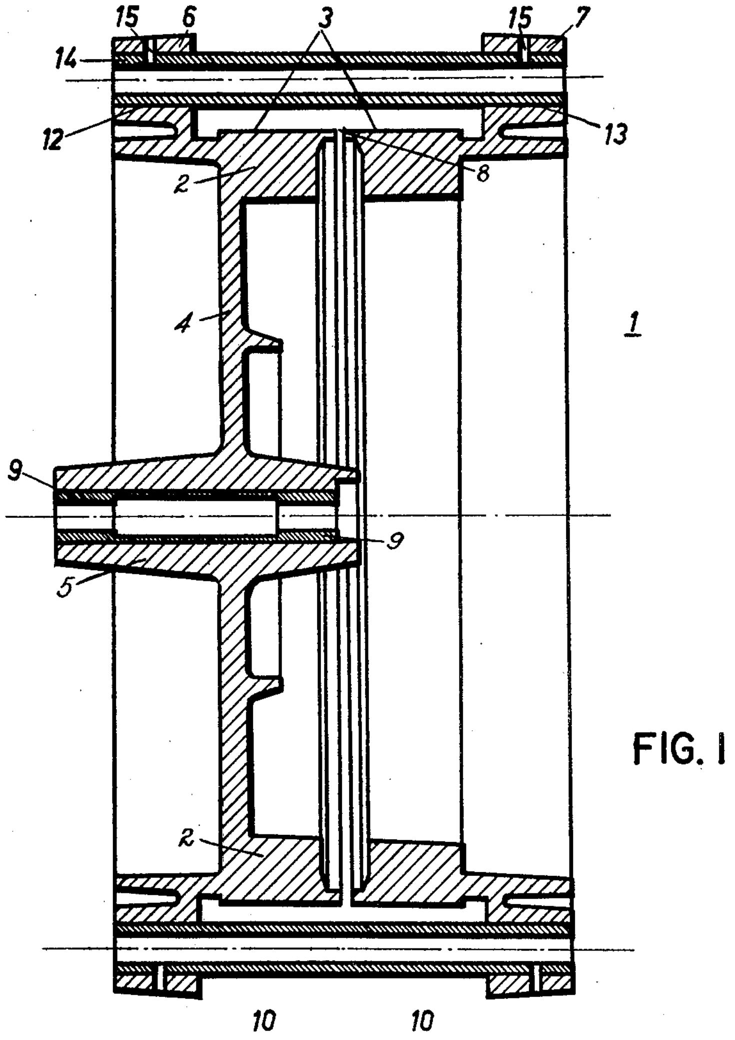

This invention relates to methods of manufacturing drums for devices intended for recording and/or reproducing signals of broad frequency spectra. In such devices, the periphery of the drum is formed by a surface of revolution over which a record carrier may be led, and the drum has a separating slot extending throughout its periphery in the plane of a circle at right angles to the drum axis. The slot accommodated recording and/or scanning members or the like journalled in the drum itself to rotate about the axis of the surface of revolution bounding the periphery.

As is well-known, for recording broad frequency spectra such as those of video-signals, for example, only a high relative speed of the recording and/or scanning member with respect to the record carrier is required; the absolute speed need not be high. If the device is designed, for example so that a tape-shaped record carrier slowly moves in an inclined direction up a stationary drum having a cylindrical peripheral surface and winds itself once around the drum so that the turn closes over the separating slot, the recording member moving in the separating slot writes closely spaced tracks on the record carrier extending in inclined direction across the width of the carrier. For the magnetic recording of video-signals by means of such a device, even if the drum is of a size which can easily be handled, the speed of the tape may be the same as is required for recording acoustic signals.

The manufacture of the drum for use in such devices presents many difficulties. The periphery of the drum is divided by the separating slot into two independent halves. The surfaces of the two halves must complement each other with high accuracy in order to form the surface of revolution required for the peripheral surface of the drum. The separating slot must not only extend accurately in the plane of a parallel circle of the surface of revolution, but must also have the same, accurately pre-determined dimensions throughout its periphery. Also, the bearing shaft for the rotary parts must accurately coincide with the axis of the surface of revolution. Reproducible recordings may be obtained only if these conditions are adhered to with extremely small tolerance limits. The manufacture of such a drum from two separate halves, each of which fulfilled the above requirements, would be possible only with the use of adjusting methods which are complicated and expensive.

An object of the invention is to provide a method of manufacturing such a drum which is extremely simple and at the same time absolutely accurate and inexpensive. According to one aspect of the invention, manufacture of the drum is started from a single piece of material, the bearing for the rotary parts being manufactured on this piece of material and the peripheral surface thereof processed; subsequently, a permanent rigid connection between the two end surfaces is made externally of the periphery of the drum and then the separating slot is formed with the use of the bearing for the rotary parts by processing from the interior of the periphery.

The mandrel used in known manner for pressing the bearing for the rotary parts into the drum is advantageously left within the drum and utilized as a bearing for the drum during the subsequent processings.

Furthermore it is preferable for the edges of the separating slot to be formed by ripping out the material at the same time as the peripheral surface is fine-processed.

The rigid connection between the two end surfaces outside the periphery of the drum is advantageously made by means of a plurality of bolts, pins or tubes which are inserted into corresponding bores provided in projecting lugs on the two end surfaces of the drum, divided over the periphery thereof, and which are fixed in said bores by providing them with bores and placing locking pins therein.

In the method according to the invention, no adjustments are required and all the operations are limited to their simplest form; nevertheless, a maximum degree of accuracy is attained.

Figure 2:
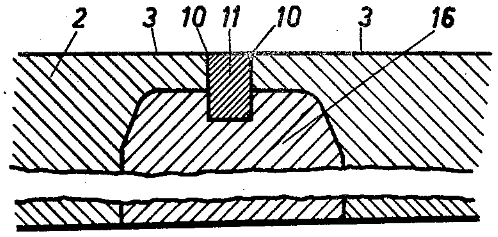

In order that the invention may be readily carried into effect, one embodiment thereof will now be described in detail, by way of example, with reference to the accompanying diagrammatic drawing, in which:

FIGURE 1 shows a cross-section through the axis of a drum made in accordance with the invention, and FIGURE 2 shows individual processing stages involved in forming a separating slot in the drum shown in FIGURE 1.

For the manufacture of the drum a casting 1 is used which is made in one piece having a shape and dimensions roughly corresponding to those of the desired drum. The hollow drum 2 itself with its cylindrical peripheral surface 3 is closed on one side by a plate 4 which carries a sleeve 5 adapted to receive a bearing. At its two end surfaces, the drum 2 has rings 6 and 7 projecting from the peripheral surface 3. It is assumed that the separating slot 8 is not present in the casting as yet. The first step is to manufacture the bearing 9 which is required for the elements rotating within the drum and carrying the recording and/or scanning members, the bearing must be formed as a two-part member in the example shown. In order to attain maximum accuracy, the mandrel employed for pressing the bearing into the drum is advantageously left therein and utilized as a bearing for the drum during the following processings. It is thus ensured that all the rotational motions to be carried out during processing and the rotation of the scanning members in the completed drum necessarily take place accurately about one axis. It is naturally required for the mandrel to be processed more accurately than is normally the case for such mandrels.

With the use of the bearing 9 on the mandrel therein, the cylindrical peripheral surface 3 of the drum is formed by turning off and fine processing. If desired, the peripheral surface may be covered with a hard chromium layer to make it more resistant to wear Preferably also at this step the edges 10 of the separating slot 8, located on the peripheral surface, are formed by turning out a portion 11 of the material (see FIGURE 2). This is done by forming the edges 10 exactly into parallel circles of the peripheral surface. Since the depth of the portion 11 extends only into part of the thickness of the drum 2, any risk of deformation of the drum surface is avoided since the drum at this stage is not yet divided into two halves; it therefore remains rigid and the surface 3 does not deform and retains its alignment.

The next step is to make bores 12 and 13 in the rings 6 and 7 projecting from and arranged on the two end surfaces of the drum. Corresponding bores are provided in the rings 6 and 7 in one operation so that they are exactly aligned. Then bolts 14 connecting the rings are inserted. Correspondingly fitting bolts may be inserted into aligned bores without introducing tensions. Preferably, each ring is provided with three bores which are evenly spaced over the periphery thereof.

After being secured in the rings 6 and 7, the bolts 14 provide an absolutely stable connection between the two terminal surfaces of the drum; the bolts may be screwed in or provided with bores in which locking pins 15 are placed.

The invention is not limited to the use of bolts. The two end surfaces may alternatively be connected with the use of pins, tubes or the like. Also the rings 6 and 7 need not extend throughout the periphery. As an example of an alternative, the periphery may be provided with projecting lugs in which the bores 12 are made.

As a result of the above steps, a stable, constant connection between the two end surfaces of the drum is achieved with no tension being produced in the whole device. It is thus possible during the subsequent processing to form the separating slot 8 in the drum 3 without the possibility of shifts in the relative position of the two resulting halves. The separating slot is formed by turning out from the interior. If the edges 10 of the separating slot 8 located on the peripheral surface 3 of the drum have previously been formed by removing the material 11, it is necessary only to remove the material 16 (FIGURE 2) located behind the resulting groove to make the separation of the drum halves complete. Such formation of the separating slot in two steps guarantees that the edges 10 between which the scanning members will move are formed very accurately. However, if one proceeds carefully, the portion 11 of the peripheral material located between the edges 10 may likewise be removed from the interior of the drum. After removal of the mandrel from the bearing 9, the drum is completed.

While the invention has been described with respect to one embodiment, various changes and modifications will be readily apparent to those skilled in the art without departing from the inventive concept, the scope of which is set forth in the appended claims.

What is claimed is:

1. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, and an elongated bearing aperture arranged in at least one of said end surfaces substantially at the axis of the drum, pressing a bearing into said bearing aperture, processing said peripheral surface to the desired drum periphery, making a permanent rigid connection between said two end surfaces externally of the drum periphery, and forming said separating slot by processing from the interior of the drum.

2. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, and an elongated bearing aperture arranged in at least one of said end surfaces substantially at the axis of the drum, pressing a bearing into said bearing aperture, processing said peripheral surface to the desired drum periphery and forming the edges of the separating slot by removing the material defining said edges at the peripheral surface, making a permanent rigid connection between said two end surfaces externally of the drum periphery, and completing the forming of said separating slot by processing from the interior of the drum.

3. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, and an elongated bearing aperture arranged in at least one of said end surfaces substantially at the axis of the drum, pressing a bearing into said bearing aperture with said bearing on an accurately processed mandrel, maintaining the mandrel therein while processing said peripheral surface to the desired drum periphery, making a permanent rigid connection between said two end surfaces externally of the drum periphery, forming said separating slot by processing from the interior of the drum, and removing said mandrel.

4. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, and an elongated bearing aperture arranged in at least one of said end surfaces substantially at the axis of the drum, pressing a bearing into said bearing aperture with said bearing on an accurately processed mandrel, maintaining the mandrel therein while processing said peripheral surface to the desired drum periphery and forming the edges of the separating slot by removing the material defining said edges at the peripheral surface, making a permanent rigid connection between said two end surfaces externally of the drum periphery, completing the forming of said separating slot by processing from the interior of the drum, and removing said mandrel.

5. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, a lug portion projecting from each end surface externally of the drum periphery, and an elongated bearing aperture arranged in at least one of said end surfaces substantially at the axis of the drum, pressing a bearing into said bearing aperture, processing said peripheral surface to the desired drum periphery, making a permanent rigid connection between said two end surfaces by forming corresponding bores in said projecting lug portions and fixing connecting means in said bores, and forming said separating slot by processing from the interior of the drum.

6. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising: producing a single-piece casting having a peripheral surface generally corresponding to the desired periphery of the drum, two end surfaces, a lug portion projecting from each end surface externally of the drum periphery, and an elongated bearing aperture arranged in at least one of said end surfaces substantially at the axis of the drum, pressing a bearing into said bearing aperture with said bearing on an accurately processed mandrel, maintaining the mandrel therein while processing said peripheral surface to the desired drum periphery, making a permanent rigid connection between said two end surfaces by forming corresponding bores in said projecting lug portions and fixing connecting means in said bores, forming said separating slot by processing from the interior of the drum, and removing said mandrel.

7. A method as recited in claim 6, including the further step of forming corresponding other bores in said connecting means and lugs and placing locking pins therein.

8. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising, starting from a single-piece casting having a peripheral surface generally corresponding to the desired periphery of the drum, two end surfaces, lug portions extending from said two end surfaces, and an elongated bearing aperture arranged in at least one of said end surfaces substantially at the axis of the drum: pressing a bearing into said bearing aperture, processing said peripheral surface to the desired drum periphery, making a rigid connection between said two end surfaces externally of the drum periphery, and forming said separating slot by processing from the interior of the drum.

9. A method of manufacturing a drum for apparatus adapted to record and/or reproduce signals having a broad frequency spectrum, the drum having a separating slot extending throughout its periphery adapted to accommodate recording and/or reproducing members journalled in the drum to rotate about the drum axis, comprising, starting from a single-piece casting having a peripheral surface generally corresponding to the desired periphery of the drum, two end surfaces, lug portions extending from said two end surfaces, and an elongated bearing aperture arranged in at least one of said end surfaces substantially at the axis of the drum: pressing a bearing into said bearing aperture with said bearing on an accurately processed mandrel, maintaining the mandrel therein while processing said peripheral surface to the desired drum periphery and forming the edges of the separating slot by removing the material defining said edges at the peripheral surface, making a rigid connection between said two end surfaces externally of the drum periphery, completing the forming of said separating slot by processing from the interior of the drum, and removing said mandrel.

References Cited by the Examiner

UNITED STATES PATENTS

| | | | |
|---|---|---|---|
| 2,042,701 | 6/36 | Dake | 29—414 |
| 2,082,199 | 6/37 | Dake | 29—414 |
| 2,109,470 | 3/38 | Dake | 29—414 |
| 2,513,409 | 7/50 | Grafstein et al. | 346—138 |
| 3,012,841 | 12/61 | Autere et al. | 346—138 |

WHITMORE A. WILTZ, *Primary Examiner.*

THOMAS H. EAGER, *Examiner.*